United States Patent [19]

Yuasa et al.

[11] Patent Number: 5,750,246

[45] Date of Patent: May 12, 1998

[54] FACING FOR SEAT

[75] Inventors: Hiroshi Yuasa, Funabashi; Kozo Furuichi, Gotenba, both of Japan

[73] Assignees: Kurashiki Boseki Kabushiki Kaisha, Okayama-ken; Ikeda Bussan Co., Ltd., Kanagawa-ken, both of Japan

[21] Appl. No.: 612,540

[22] Filed: Mar. 8, 1996

[30] Foreign Application Priority Data

Mar. 10, 1995 [JP] Japan ................... 7-050964

[51] Int. Cl.$^6$ ................... B32B 27/12
[52] U.S. Cl. ................... 428/318.4; 428/319.7; 297/250.1
[58] Field of Search ................... 428/318.4, 319.7, 428/920; 297/250.1

[56] References Cited

U.S. PATENT DOCUMENTS

| | | | |
|---|---|---|---|
| 3,574,873 | 4/1971 | Weinstein | 5/348 |
| 5,248,185 | 9/1993 | Weingartner et al. | 297/452.58 |
| 5,298,321 | 3/1994 | Isoda et al. | 428/288 |

FOREIGN PATENT DOCUMENTS

| | | |
|---|---|---|
| 0012906 | 7/1980 | European Pat. Off. |
| 0044114 | 1/1982 | European Pat. Off. |
| 753/68 | 7/1967 | Ireland |
| 1-76220 | 5/1989 | Japan |
| 1-127737 | 8/1989 | Japan |
| 1049193 | 11/1966 | United Kingdom |
| 1272241 | 4/1972 | United Kingdom |
| 1458664 | 12/1976 | United Kingdom |

OTHER PUBLICATIONS

English translation of JP01076220, May 1989.

*Primary Examiner*—Kathleen Choi
*Attorney, Agent, or Firm*—Birch, Stewart, Kolasch & Birch, LLP

[57] ABSTRACT

The present invention provides a light-weight and luxury facing for seat which hardly gives rise to folding wrinkles when it is applied to one surface of a cushion constituting a seat; the facing for seat composed of the lamination of a surface material made of fabrics, a flexible cellular plastic middle layer, and a backing, in which the backing is made of a low friction synthetic resin, preferably the backing is coated with a coating agent, particularly preferably said coating agent is prepared from an oxidized polyethylene wax latex or polyvinylidene chloride or ethylene-vinyl acetate copolymer latex or mixture thereof.

5 Claims, No Drawings

FACING FOR SEAT

BACKGROUND OF THE INVENTION

The present invention relates to a facing for a seat by which a cushion surface made of a polyurethane foam and the like is covered.

A facing covering over a cushion surface is preferably composed of a flexible fabric and the like so as to follow the transformation of the cushion.

In case that the facing for the seat by which the cushion surface is covered is made of the fabric itself, it is liable to wrinkle and shear in a pattern, because the facing is to be often cut out or sewed with warp due to excellent flexibility and elasticity inherent to the fabric, when the facing is cut out and sewed to a shape covering the seat cushion. The facing for seat of three-layers structure obtained by laminating a surface material, a flexible cellular plastic layer and a backing composed of a woven or non-woven fabric in order to prevent such warps and wrinkles as well as to provide feeling of high quality such as weightiness, soft touchiness and the like (Utility Model Application KOKAI No. Hei 1-76220 etc.), wherein the flexible cellular plastic layer is used for providing a slight rigidity to the fabric so as to prevent it from warping at cutting out and sewing, and the backing composed of the woven or non-woven fabric is given to facilitate the sliding property of a sewing machine and the covering on the cushion.

It has been found that the three-layers facing for seat has following defects:

(1) There is a case that the surface of the facing wrinkles after the seat is covered with the facing, because the surface material has excellent flexibility and elasticity to the contrary, the backing is hard and of little elasticity. Further, when steamed for removing the wrinkles after covering the seat, the surface material, though it is depended on the kinds of the material, shrinks so as to increase the wrinkles in some cases.

(2) When a polyurethane foam is used as a flexible cellular plastic, a flame laminate process is applied for production of the facing composed of a surface material/polyurethane foam/backing. In the flame laminate process the tension control of the surface material, polyurethane foam and backing respectively is essential for the preparation of the flat laminated facing. If each tension is unbalanced the facing obtained is curled depended on the kind of the backing, undesirable wrinkles are occurred after the seat is covered with the facing. When stiff materials such as non-woven fibers of polypropylene and the like are used as the backing, the facing is liable to wrinkle on the surface.

(3) Seats have been shaped to fit a human body recently, but they cannot sufficiently follow the shape of cushion due to the backing.

SUMMARY OF THE INVENTION

The present invention is to provide (1) a lightweight and luxurious facing for seat which is hardly folded or wrinkled at hollows when a cushion of the seat is covered with the facing, and (2) a facing for seat excellent in flame resistance.

DETAILED DESCRIPTION OF THE INVENTION

The present invention relates to a facing for seat in which a seat cushion surface is covered with a laminate of a surface material made of fabrics, a flexible cellular plastic middle layer and a backing and said backing is made of a low friction synthetic resin layer.

Further, the present invention provides a facing for seat in which the backing is made of a low friction synthetic resin layer having a friction coefficient of 0.3 to 1.0.

Furthermore, the present invention provides a facing for seat in which the low friction synthetic resin layer forming the backing is coated with a coating agent.

Furthermore, the present invention provides a facing for seat in which the low friction synthetic resin layer forming the backing is coated with a latex of an oxidized polyethylene wax latex, a polyvinylidene chloride, a latex of an ethylene-vinyl acetate copolymer or a mixture thereof.

Another embodiment of the present invention is a facing for seat additionally containing a flame retardant in the low friction synthetic resin layer.

The low friction synthetic resin is used for the backing according to the present invention. The purpose of use of the backing is to facilitate the sliding property on a sewing machine and the covering on the cushion, and to function as a support at sewing. Accordingly, the material to be used for the backing should meet these requirements without the defects as aforementioned. The lubricative resin usable for the backing in the present invention meets the above requirement. The low friction synthetic resin is used for materials having a function as a backing without losing characteristics of the surface material and the lightweight cellular plastic middle layer. Such a resin layer preferably has a dynamic friction coefficient of from 0.3 to 1.0.

Such a synthetic resin is preferably coated as a coating agent. The coating agent is coated on the back surface of the flexible cellular plastic layer, and dried to a thin layer to form the backing of the present invention. The thin layer in the present invention is referred to one having a gas permeability. Further, it includes one embodiment in which all over the back surface of the flexible cellular plastic layer is coated with a coating agent to form a layer, and another embodiment in which the coating agent is dotted on the back surface of the flexible cellular plastic layer, for example, the coating agent forms a layer as resinous particles. Any synthetic resin latex may be used providing it has a layer formability and a low friction, the example of which include a polyvinylidene chloride latex, an internal plasticized polyvinyl chloride, a low molecular weight polyolefine latex, an ethylene/vinyl acetate/vinyl chloride copolymer latex, an acrylate copolymer latex such as methyl acrylate/butyl acrylate copolymer latex and the like, a polyurethane urea latex and mixture thereof. Examples of more preferable latex include ethylene-vinyl acetate copolymer latex and oxidized polyethylene wax latex, a polyvinylidene chloride, particularly mixture thereof is most preferable because these latexes are excellent in the adhesive property with a flexible polyurethane foam and in the low friction property. In case that the lubricity of the synthetic resin is deficient for the backing, the synthetic resin can be made usable by adding a lubricant into the latex in the present invention. In case of a latex which is poor in the adhesive property to the flexible cellular plastic, the surface of the cellular plastic may be pre-coated with a suitable latex.

Suitable amount of the coating agent to be coated in case that it is used is within 10 g/m$^2$ to 40 g/m$^2$. If the amount is less than 10 g/m$^2$, a sufficient lubricity is difficultly obtained, whereas if it is more than 40 g/m$^2$ the flexibility of the facing becomes so reduced that the fitting property to the cushion is lowered, the facing wrinkles, and the advantageous effect of the present invention cannot be obtained. Most preferable amount of the coating agent to be coated is 15 to 25 g/m².

Examples of coating method of the coating agent on the flexible cellular plastics include a conventional emulsion coating method such as a roll-coating, a spray coating, a doctor knife coating and the like. When the roll coating or the doctor knife coating is used, the viscosity of the coating agent is preferably controlled from 8.000 cps to 20.000 cps in order to improve the productivity.

Various kinds of flame retardants may be mixed with the coating agent in order to provide flame resistants to the facing. Preferable examples of the flame retardants are solid fine particles, which may be, for example, melamine, antimony trioxide, aluminum hydroxide and the like in order to provide a lubricity simultaneously. Liquid flame retardants such as phosphorus or halogen type flame retardants tend to bleed though depended on the amount to be used, so that the lubricity will be lowered sometimes.

Lubricants such as metal soaps (e.g. calcium stearate), inorganic lubricants (e.g. talc), fillers such as silica, alumina, calcium carbonate, clay and the like, pigments, thickeners, antifoamers or any other additives may be added other than the flame retardants if desired.

Fabrics to be used as the surface material according to the present invention are used for decorating the cushion for seat and for improving the surface feeling thereof. Examples of the fabrics include various natural or synthetic materials in the form of a tricot, a raising tricot, a raschel, a jersey, a sinker pile, a moquette, a knit, a textile and the like. The fabrics of the present invention may include a PVC leather, a real skin and the like.

The flexible cellular plastic layer is used for preventing the wrinkles generated at cutting or sewing of the facing, the slippage of pattern or figure, the generation of folding at hollows in the cushion when the facing is applied on the surface of the cushion by controlling the elasticity and the flexibility of the surface material without losing soft touchiness of the surface material and the cushion property required for seat. The flexible cellular plastic layer is controlled to a suitable hardness according to the requirement for the cushion such as touchiness and the like, and usually a flexible polyurethane foam having a hardness of 7 to 50 kg/314 cm² (JIS K6401) is preferably used, particularly one subjected to flame proofing. The thickness of the flexible cellular plastic layer is usually 1 to 20 mm, more preferably 2 to 10 mm though it is selected according to the thickness required in the facing, soft touchiness, cushion property, folding or wrinkles as aforementioned.

The flexible cellular plastic layer, for example, may be formed by laminating the flexible polyurethane foam previously shaped to a sheet having a thickness of the above range with the fabric of the surface material by an adhesive agent, or may be formed by coating polyurethane emulsions containing numerous foams on the back surface of the fabric in a given thickness and then heat-cured.

EXAMPLE 1

Latex for the backing was prepared by mixing the following ingredients:

| synthetic resin latex | parts by weight |
| --- | --- |
| oxidized polyethylene wax (solid: 40%, pH: 5) | 50 |
| ethylene/vinyl acetate copolymer (solid: 58%, pH: 5) | 50 |
| flame retardant | |
| melamine | 15 |
| antimony trioxide | 10 |
| silicone antifoamer | 0.1 |
| modified polyacrylic acid type thickener | 7.5 |

The latex prepared by the above method was applied to one surface of flexible polyurethane foams (thickness: 5 mm, density: 25 kg/m³, hardness: 10 kg/314 cm²) by a roll coator in the amount of 20±5 g/m² referring to the dryweight of the latex. The resultant was held in a hot air dryer controlled at 140±2° C. to be dried for one minute, by which a synthetic resin layer was formed on the surface of the flexible polyurethane foam.

Thereafter, a surface material, tricot (density 450 g/m²) was laminated on the surface of the above flexible polyurethane foam having the synthetic resin layer by a flame laminating method to give a non-cut three-layer facing for seat.

EXAMPLES 2–14

Non-cut three-layer facings for seat were prepared according to the similar manner as in the Example 1 excepting the latex composition was changed by the formulations shown in Table 1 respectively.

TABLE 1

| | latex formulations (parts by weight) | | | | | | | |
| --- | --- | --- | --- | --- | --- | --- | --- | --- |
| | Ex. 1 | Ex. 2 | Ex. 3 | Ex. 4 | Ex. 5 | Ex. 6 | Ex. 7 | Ex. 8 |
| (synthetic resin latex) | | | | | | | | |
| oxidized polyethylene wax | 50 | 80 | 20 | 100 | | | | |
| ethylene/vinyl acetate copolymer | 50 | 20 | 80 | | 100 | | | 100 |
| ethylene/vinyl acetate/vinyl chloride copolymer | | | | | | 50 | | |
| polyvinylidene chloride | | | | | | 50 | | |
| low molecular weight polyolefine A | | | | | | | 100 | |
| low molecular weight polyolefine B | | | | | | | | |
| (flame retardant) | | | | | | | | |
| melamine | 15 | 15 | 15 | 15 | 15 | 15 | 15 | |
| antimony trioxide | 10 | 10 | 10 | 10 | 10 | 10 | 10 | 5 |

TABLE 1-continued

| | | | | | | | | |
|---|---|---|---|---|---|---|---|---|
| halogen-containing phosphoric acid ester emulsion | | | | | | | | 10 |
| thickener | 7.5 | 7.5 | 7.5 | 7.5 | 7.5 | 7.5 | 7.5 | 7.5 |
| antifoamer | 0.1 | 0.1 | 0.1 | 0.1 | 0.1 | 0.1 | 0.1 | 0.1 | oxidized polyethylene wax: solid 40%, pH = 5
ethylene/vinyl acetate copolymer: solid 58%, pH = 4.7,
ethylene/vinyl acetate/vinyl chloride copolymer: solid 52%, pH = 5
polyvinylidene chloride: solid 49%, pH = 2.5
low molecular weight polyolefine A: solid 40%, pH = 3
low molecular weight polyolefine B: solid 40%, pH = 9
defoamer (silicone type): solid 45%
thickener (modified polyacrylic acid): solid 12%

| | latex formulations (parts by weight) | | | | | |
|---|---|---|---|---|---|---|
| | Ex. 9 | Ex. 10 | Ex. 11 | Ex. 12 | Ex. 13 | Ex. 14 |
| (synthetic resin latex) | | | | | | |
| oxidized polyethylene wax | | | 50 | | 50 | |
| ethylene/vinyl acetate copolymer | | | | | 50 | |
| ethylene/vinyl acetate/vinyl chloride copolymer | | | | | | |
| polyvinylidene chloride | 99 | 50 | 50 | 99 | | 99 |
| low molecular weight polyolefine A | | | | | | |
| low molecular weight polyolefine B | 1 | 50 | | 1 | | 1 |
| (flame retardant) | | | | | | |
| melamine | 10 | 10 | 10 | | | |
| antimony trioxide | 15 | 15 | 15 | | 20 | 20 |
| halogen-containing phosphoric acid ester emulsion | | | | 30 | 30 | 30 |
| thickener | 7.5 | 7.5 | 7.5 | 7.5 | 7.5 | 7.5 |
| antifoamer | 0.1 | 0.1 | 0.1 | 0.1 | 0.1 | 0.1 |

Facings for cushion seat made of a polyurethane foam were prepared by cutting and sewing the above non-cut three-layers facings for seat obtained by the Examples 1–14. Any three-layers facings can be easily cut and smoothly sewn by a sewing machine. Covering of the cushions is easy and can be fit to hollows of the cushion seats without ugly folding wrinkles.

EVALUATION OF THE PROPERTIES

[PHYSICAL PROPERTIES]

Each non-cut three-layers facing for seat prepared according to the Examples 1–14 was evaluated with respect to the properties for the facing for seat, the each result of which was shown in Table 2. The term "low grade sounds" means the strength of unfavorable sounds generated between the cushion seat and the backing of the facing for seat. Satisfactory properties were obtained in every case.

TABLE 2

| Examples | friction coefficient | low grade sound (dbA) | abrasion | | total evaluation |
|---|---|---|---|---|---|
| 1 | 0.76 | 63 | more than 1500 times | ○ | ○ |
| 2 | 0.77 | 64 | more than 1500 times | ○ | ○ |
| 3 | 0.80 | 67 | more than 1500 times | ○ | ○ |
| 4 | 0.77 | 71 | 1000 times | Δ | Δ |
| 5 | 0.75 | 66 | 1000 times | Δ | Δ |
| 6 | 0.83 | 59 | more than 1500 times | ○ | Δ |
| 7 | 0.90 | 67 | 1000 times | Δ | Δ |
| 8 | 0.95 | 66 | more than 1500 times | ○ | Δ |
| 9 | 0.88 | 66 | more than 1500 times | ○ | Δ |
| 10 | 0.83 | 64 | more than 1500 times | ○ | Δ |
| 11 | 0.82 | 63 | more than 1500 times | ○ | Δ |
| 12 | 0.86 | 64 | more than 1500 times | ○ | Δ |
| 13 | 0.78 | 65 | more than 1500 times | ○ | ○ |
| 14 | 0.86 | 64 | more than 1500 times | ○ | Δ |
| Comparative Example 1 | 1.23 | 62 | 500 times | x | x | note:
friction coefficient: ○: <0.8  Δ: 0.8–1.0  x: >1.0
low grade sound: ○: <70  Δ: 70–80  x: >80
total evaluation: ○: all evaluation being ○
Δ: evaluation including at least one Δ
x: evaluation including at least one x

[FLAME-RESISTANT]

Every non-cut facing of the Examples 1–14 were evaluated for the durability of flame-resistance according to the FMVSS 302 Standard. Every facing passed this Standard.

Comparative Example 1

A two-layers facing for seat was prepared by laminating the surface material of the Example 1 and the flexible polyurethane foam without the latex for the backing. The obtained facing was not smooth on sewing and was bad in the workability. Further, the obtained sewed product was ugly with wrinkles in in place. When the seat was covered, the workability became lower due to the large friction resistance with a molded polyurethane.

EVALUATION

The evaluation of the Examples (Table 2) was made according to following methods.

[friction coefficient]

The three-layers facing products were fixed as backing up on a sliding stand, on which a load of 400 g was put. The load was made of a molded urethane pad (density: 35 kg/m$^3$), and connected with a fixed load-cell, so that the drawing force on the molded pad by a friction force was loaded on the load cell. Under this condition the sliding stand was moved at a rate of 10 mm/sec, and the dynamic friction coefficient was calculated from the stress loaded on the load cell.

[low grade sound]

The friction sound which was generated by rubbing the molded pad and the backing material of the facing under a given load, in a given direction and at a constant rate was expressed by dbA.

[abrasion]

The facing was fixed as backing up, on which a load of 500 g covered with a nylon non-woven (50 g/m$^2$) was put, and the load was moved left and right at a stroke of 100 mm and 30 times/min. The durability against the abrasion was evaluated in the times of the abrasion till the backing was shaved.

What we claim is:

1. A facing for a seat cushion, which comprises a backing layer, a flexible cellular plastic middle layer provided on said backing layer, and a surface layer made of fabric provided on said middle layer;

wherein said backing layer has a coefficient of dynamic friction of 0.3 to 1.0 and is formed by coating and drying a latex of synthetic resin on said middle layer, and wherein said latex is selected from the group consisting of an oxidized polyethylene wax latex, a polyvinylidene chloride latex, an ethylene-vinyl acetate copolymer latex and mixtures thereof.

2. The facing according to claim 1, wherein said backing layer additionally contains a flame retardant.

3. The facing according to claim 1, wherein said synthetic resin is selected from the group consisting of polyvinylidene chlorides, polyolefins, ethylene-vinyl acetate copolymers, ethylene-vinyl chloride copolymers, acrylate copolymers, and mixtures thereof.

4. The facing according to claim 1, wherein said middle layer comprises polyurethane foam.

5. The facing according to claim 1, wherein said surface layer fabric comprises tricot, raschel, jersey, sinker pile, PVC leather, or natural leather.

* * * * *